April 11, 1939.  L. S. M. LEJEUNE  2,153,966
MANUFACTURE OF POWER TRANSMISSION BELTS
Filed Sept. 2, 1936
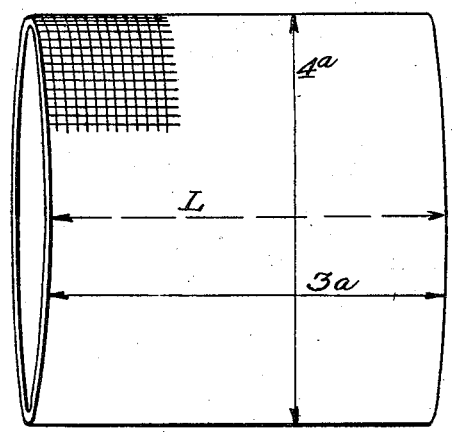
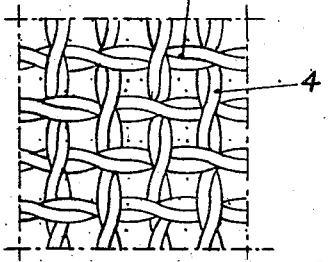
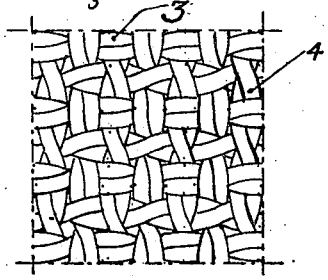
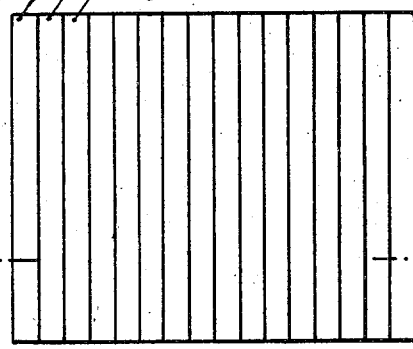
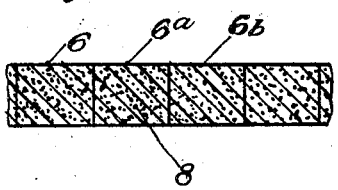
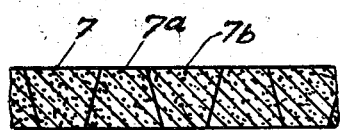
Inventor:—
Leon Sylvain Max Lejeune
By Mauro & Lewis.
Attorney.

Patented Apr. 11, 1939

2,153,966

UNITED STATES PATENT OFFICE 2,153,966

MANUFACTURE OF POWER TRANSMISSION BELTS

Léon Sylvain Max Lejeune, Paris, France, assignor, by mesne assignments, to Hevaloid Corporation, Dover, Del., a corporation of Delaware Application September 2, 1936, Serial No. 99,152
In France November 25, 1933

11 Claims. (Cl. 154—4)

My present application relates to the manufacture of endless transmission belts and is a continuation-in-part of my prior application, Serial No. 741,707, filed August 27, 1934, now abandoned.

The present invention relates to the manufacture of power-transmission belts and has for its principal object the production of endless and unjointed belts having great durability and other desirable properties, by a process which has the advantages of great economy in operation and uniformity of production.

An important advantage of the invention is that endless and unjointed belts can be made thereby which have a fixed length, that is, which are not liable to stretch in service, even after a long period of use, to an extent which impairs their efficiency. The use of endless and unjointed belts has been greatly restricted by the fact that such belts, as heretofore made, undergo in use a considerable permanent elongation. This inconvenience has been obviated to some extent by the use of grooved pulleys and belts of trapezoidal cross-section, or by the use of tension regulating means. The first-named expedient has the serious disadvantage of low efficiency in power transmission, due mainly to the friction of the belt upon the sides of the V-shaped groove. Tension regulating devices are expensive, heavy and wasteful of power.

By the process herein described, endless and unjointed power transmission belts may be made which not only have a virtually permanent length, but which have their elasticity primarily fixed at such a degree as to compensate for the small elongations to which the belts may be subjected during their normal period of service.

As a consequence of the herein described process the impregnation of the fabric is so thorough and the elastic material adheres to the fibers of the textile elements with such tenacity that the individual fibers cannot slide relatively to each other when the belt is subjected to stresses, as occurs when permanent elongations take place.

Furthermore, the process imparts to the belt such a great elasticity that a substantial part thereof can be eliminated by stretching, while leaving nevertheless all that is needed. It is therefore possible to transform a part of the natural elongation into elasticity.

The treatment of the tubular fabric constituting the body of the belt with a contracting and swelling agent makes possible to increase the elasticity of the belt lengthwise, while the usual way of weaving a tubular fabric diminishes its elasticity in that direction.

The weaving of the very open linear elements in the form of a tube, as herein described, facilitates regular manufacturing operations, especially with respect to the contracting and swelling treatment and to the impregnating and the stretching of the fabric, as well as to vulcanization when relatively small belts are made. The advantage in respect to the transverse stretching of the belt is specially important.

The belt comprised by the present invention has the form of an endless band of rectangular or trapezoidal section, the constituent substance of which is preferably an agglomerated mass of rubber and textile, particularly cotton, more or less swollen and contracted, the fiber of which is in the state of hydrocellulose or equivalent hydrolyzed substance such as is obtained by the action upon a textile fiber of a strong swelling and contracting agent which may be for example an alkali such as soda. In this belt the rubber is intimately united with the transformed fiber, fills the interstices thereof and adheres strongly thereto.

The process for the manufacture of this belt comprises the steps of weaving a textile tube, on looms such as are normally employed in industry for this kind of work. The fabric will be formed of rovings termed herein "special inverse twists" which are constituted of two or more spinning rovings twisted individually the same number of turns in one direction, the super-twisted rovings being then assembled by twist-ing them approximately the same number of turns in the opposite direction. These special inverse twists are very open and are substantially free from reciprocal compression of the component fibers, but they nevertheless possess a resistance to traction and an elastic elongation at least as high as that of each of the rovings that compose it, and a strength equal to or greater than the sum of the strengths of the individual rovings.

The said inverse twists per se and the process of making the same form no part of the present invention, being described and claimed in the copending application of this applicant and Emile J. A. Lejeune, Ser. No. 99,149, filed September 2, 1936.

The tubular fabric made with this inverse twist is very loosely woven, the spacing between the warp and weft threads being such that when the swelling and contraction, which will be described later, have been produced, there will be little or no compression between the inverse twists which compose the fabric.

This tubular fabric is then subjected to a treatment without tension by a suitable agent (acid or alkaline) of a strength sufficient to cause a strong contraction and swelling of the textile fibre and consequently of the inverse twists which compose the fabric; very good results are obtained with soda. For example, the desired result can be obtained by treating the tubular fabric with caustic soda lye of 30°-35° Bé. at about 18° C. for 30-60 minutes. The action of the swelling and contracting agent is facilitated by the fact that the inverse twist is very open and remains relatively open to the end of the treatment. The fabric when so treated has a comparatively close mesh without, however, there being appreciable compression between the inverse twists which compose it, the cellulose of the fibres having been transformed by the hydrolysing action of the contraction agent into hydrocellulose or analogous product. In this form the fabric has a high coefficient of elasticity being capable of elongation up to and/or even exceeding 50%.

In carrying out the contracting and swelling treatment of the loose-mesh fabric it may be useful to employ a wetting agent in the bath, in order that the tubular fabric be fully wetted through the bath in which they are immersed. As wetting agent may be employed any wetting agent which is commonly known for the usual treatments of textiles with liquids.

The tubular fabric is allowed to remain in the bath under the conditions described; afterwards the fabric is removed from the bath and is compressed so that the greater part of the bath may be recovered.

Preferably, after having been subjected to the treatment with the bath of contracting and swelling agent, and having been carefully washed, the tubular fabric according to the invention is subjected to a boiling treatment, which is carried out under the conditions usual for such a treatment in the textile industry, for example with the aid of carbonate of soda lye, at the high temperature suitable for boiling.

The boiling treatment may be carried out as follows: the fabric is carefully washed, and then submitted to the treatment of boiling performed under the ordinary conditions of such well-known operation, i. e., by means of a lye of carbonate of soda of 3%, to which there is added a soda soap of 1.5% under a pressure of 1.5 atm. corresponding to a temperature of 113° C. for 4 hours. The percentage always is calculated with respect to the weight of dry cotton.

After such boiling treatment, the tubular fabric preferably is washed with warm water (for example at 90° for about 1 hour), then with cold water, and afterwards is subjected to a treatment with a neutralizing solution of hydrochloric acid (for example of 0.5 Bé.) or the like, then is washed anew until the chlorides are eliminated.

Finally the treated fabric is carefully dried so that there only remains about 7% of wetness with respect to the weight of the dry cotton. The tubular fabric thus obtained is then ready for impregnation.

The tubular fabric transformed by the treatment above described is then impregnated with rubber by any known method capable of ensuring a very effective penetration of the rubber into the elements of the fabric and of filling the interstices between them.

This penetration is greatly facilitated by the fact that the fibres of the elements composing the fabric are not compressed one against another. The impregnation can be performed by means of rubber in solution in a solvent or even by rubber in suspension in a liquid vehicle. Rubber latex will be used, for example, containing preferably all the elements necessary for vulcanization, or latex already vulcanized or semi-vulcanized.

Preferably the impregnation is carried out as follows: the tubular fabric is immersed in a bath of latex, containing for example 40% of dry rubber with the vulcanizing agents; this immersion takes place preferably without vacuum or pressure being applied, in vats closed or other receptacles which are closed with a cover sufficiently tight to prevent the evaporation of the ammonia, which latter would result in the coagulation of the bath on its surface. After each impregnating operation, the ammonia content of the bath is brought to the required degree by adding thereto a solution of commercial ammonia.

After the impregnation, the fabric is placed in conditions suitable for coagulating of the rubber. To this effect, the ammonia is allowed to evaporate.

When the coagulation is effected, the impregnated fabric is placed in such conditions that the water still contained therein evaporates for the greater part. To this effect the fabric can be calendered with a usual calender so as to remove therefrom the greatest possible part of water; afterwards the fabric is dried in any suitable manner. Care should be taken to lower the temperature of the drying apparatus as the fabric dries. The quantity of water remaining at that time in the fabric will not exceed preferably 4% of the weight of the impregnated fabric.

The impregnation and drying of the tubular fabric having taken place, the impregnated fabric is preserved until it is desired to vulcanize the same. For this purpose the fabric is kept preferably in warehouses which are dimly lighted and not too wet. When it is desired to obtain fabrics composed of several plies or thicknesses, the component plies are to be stuck together prior to warehousing in order to prevent from exodition the surfaces of the plies.

The vulcanization may be performed either without exercising tension on the impregnated tubular fabric so as to leave it all its elasticity or while exerting a certain tension thereupon in the suitable direction so as to fix its elasticity at a lower limit. If the elements composing the fabric have for example, in the unvulcanized state an elongation before breaking of 50% the tubular fabric will be subjected to an elongation of 10% and the vulcanization will be performed in this state. The elements after vulcanization will retain a permanent elongation of 10% and will have a residual elasticity of 40%. This possibility of imparting to the fabric a fixed length is of great advantage in the case of endless belts, as stated above. Further, it should be observed that, owing to the compressibility of the linear elements, the impregnated fabric can be substantially reduced by compression during the vulcanizing operation without bringing contiguous elements into abrasive contact with each other. Hence belts made according to this invention have an efficiency in power-transmission considerably greater than that of belts of the same thickness as heretofore made. For like reasons belts made according to this invention generate but a small amount of internal heat when in use. Experience has shown that it may be of advantage to carry out the vulcanization under a pressure of about 25/30 kgs. per cm.$^2$.

The elongation given to the fabric before vulcanization may be produced either rapidly or slowly, or progressively, or in successive stages. The vulcanization may take place either immediately after the extension—in which case it will be carried out leaving the fabric upon the extending apparatus—or after the fabric has remained a sufficient time under tension after elongation so that when withdrawn from the extension apparatus it will remain elongated without undergoing substantial shortening before vulcanization. A slight excess of elongation may be given to the fabric so that after vulcanization it will have shrunk to the final length desired.

It is to be noted that it is essential to prevent any substantial bulging or warping of the fabric when impregnated due to the fact that the selvages of the same are always more compressed than the rest of the fabric. In order to avoid any risk of such bulging, it is preferred, before the operation of stretching and vulcanization, to cut the selvages of the fabric in such a manner that the strips or sheets finally obtained, are prevented from bulging. As aforesaid, the removal of the selvages by cutting should take place before the fabric is stretched.

After vulcanization and after the residual elasticity has been fixed as described above, rings will be cut from the tubular fabric thus prepared, having the desired width for the belts which it is proposed to produce. The cutting may be made either perpendicularly to the surface of the impregnated mass, thereby producing belts of rectangular section, or obliquely thereto, thereby producing belts of trapezoidal or triangular section.

The abovedescribed process has the important advantages of low operating cost and of yielding products having uniform characteristics. If care is exercised in the impregnating operation to bring about the close cohesion of the fibre and the rubber, which is facilitated by the openness of the textile elements and the absence therein of centripetal compression of the fibres, and also to fill all the interstices, including the central canal of the fibres, with rubber, there will be obtained a transmission belt which, notwithstanding its raw cut edges, is exceedingly strong, and is practically nonabsorbent of moisture (gaseous or liquid).

The attached drawing shows schematically and by way of example the different stages in the manufacture of a belt according to the invention.

Fig. 1 shows on a large scale an inverse twist intended for the manufacture of the tubular fabric;

Fig. 2 shows on a small scale a tubular element before contraction;

Fig. 3 shows on a large scale the structure of the fabric shown in Fig. 2;

Fig. 4 shows the structure of the fabric after treatment, with a contracting and swelling agent.

Fig. 5 illustrates the division of the impregnated tubular mass into belts;

Fig. 6 shows on a large scale the method of obtaining belts of rectangular section;

Fig. 7 shows on the same scale as Fig. 6 the method of obtaining belts of trapezoidal section.

As is shown in Fig. 1 the textile element used for the manufacture of the fabric intended for impregnation, for the manufacture of belts according to the invention, is composed of two spinning rovings 1 and 2 each having received a twist of a certain number of turns in one direction, for example, 200 turns per meter to the left, being then brought together and assembled by being twisted together in the opposite direction to the twist of the individual fibrous units around the axis A—A a number of turns equal or substantially equal to that by which each of the rovings has been individually twisted.

In consequence of the inverse twisting which is thus given the linear textile elements 1 and 2, they assume a very open and an equilibrized condition. They are very permeable throughout to liquids and are substantially free from reciprocal compression of their constituent fibres.

Such a twist composed as in Fig. 1 of two rovings, but which may comprise a larger number of strands, is then woven so as to form a tubular fabric of a certain width L such as that indicated in Fig. 2, this fabric having a very open weave, that is, having wide interspaces, as shown in Fig. 3.

In the fabric of Fig. 2 the warp threads are arranged in the direction 3a and the weft threads in the direction 4a.

The distance between the warp threads and that between the weft threads, whether equal or different, is in all cases such that, during the treatment which will be mentioned late, there is no compression of the threads. The tubular fabric is made of a length corresponding to a certain multiple of the width of the belts it is desired to obtain therefrom. It is then treated by a contracting and swelling agent, for example a caustic soda lye at a concentration of 30–35° Beaumé at a maximum temperature of 18° C. to which has been added in the commonly used proportions a suitable wetting agent, the duration of the treatment being 30–60 minutes, and no tension being exerted upon the fabric. Instead of caustic soda lye, or other alkaline agents, a suitable acid, such as sulfuric acid, may be used. In consequence of this treatment, the fibres swell and contract and the warp threads approach one another as well as the weft threads so as to form a more closely woven fabric but one in which there is no appreciable compression of the constituent threads of the fabric. After the treatment with the contracting and swelling agent, the fabric is subjected to the boiling, washing, and drying treatment as hereabove explained.

Fig. 4 shows on the same scale as in Fig. 3 a portion of the fabric after treatment.

This treatment has the effect of imparting to the tubular fabric increased strength and capacity for stretching.

The fabric is then impregnated with rubber. If the impregnation is to be carried out by means of a solution of rubber in a very volatile solvent the fabric is first washed, it is dried, and it is then immersed in the solution of rubber. If the impregnation is to be carried out with latex or any other emulsion or suspension of natural, artificial or regenerated rubber, the fabric is soaked, after washing, in such emulsion or suspension. This latter will contain preferably vulcanizing agents and their accelerators and activators. The conditions of impregnation and treatment before vulcanization are preferably such as indicated hereabove.

When the impregnation is judged to be sufficient, which may take from 4 hours to 24 hours according to the nature of the fabric and that of the impregnating bath and the method of impregnation, the impregnated fabric is withdrawn and dried, as hereabove explained. A strongly rubber-impregnated tubular fabric is thus obtained. This fabric may then be either vulcanized as it is and without tension, or it may be vulcanized under tension. Alternatively the fabric may be vulcanized without tension but whilst still under the effect of a tension previously applied. For instance the fabric may be left under tension for such length of time that after it is withdrawn from the tensioning apparatus it will not shrink appreciably. The tension given to the tubular fabric in the peripheral direction and that given in the longitudinal direction are such that they bring the fabric to the dimensions which are required. Thus, for example, in the direction 3a of Fig. 2 there will be given a tension such that it brings the tubular fabric to a dimension which completely suppresses its residual elongation while in the direction 4a either no tension may be given or a tension such as will give to the belt that length which leaves it the desired residual elasticity. When these operations of vulcanization are finished the impregnated fabric is cut according to the diagram of Fig. 5 so as to detach from it, rings 5, 5a, 5b, etc., having the width of the belts it is desired to obtain. The cutting may take place as shown in Fig. 6 in the directions 6, 6a, 6b, etc., perpendicular to the face of the impregnated and vulcanized fabric or as is shown in Fig. 7 in oblique directions 7, 7a, 7b, etc. In the first case belts of rectangular section 8 are obtained, in the second case belts of trapezoidal section 9.

It is thus seen that according to the present invention belts are obtained by simple, rapid and inexpensive operations, starting from textile elements, easy to make and to weave. The manufacture of the inverse twists is in fact most simple, since it involves only the rotation of the rovings a small number of turns first in one direction and then in the other, yet it results in a strong and elastic product. The weaving of these inverse twists is as easily performed as that of spun threads. The treatment of the fabric also is extremely simple, comprising only immersing the fabric in the swelling and contracting agent followed by washing.

The impregnation may be effected easily by processes which necessitate neither vacuum nor pressure and consequently which do not involve the use of any costly apparatus.

Vulcanization without elongation or without tension after elongation is likewise extremely simple.

Vulcanization under tension is not a complicated matter. It may be easily effected by means of ordinary stretching apparatus with the aid of appliances in common use.

Finally the cutting of the belts to the width desired is effected by a customary technical operation. Instead, however, of constituting a tubular fabric from which rings are cut to form belts, the process forming the object of the invention may also be applied to the manufacture of belts without the cutting of such a fabric, by weaving a tubular fabric of a width at the beginning that, after it has undergone the treatments described above of swelling with contraction, washing, impregnation, and vulcanization, and if desired of stretching before vulcanization, it has the exact width of the belt to be made.

Belts made as herein described, besides being produced at very low net cost, have the advantage of possessing very high strength and residual elasticity as well as remarkable qualities of rot-proofness and resistance to wear.

A particularly important application of the invention consists in making by means of the process described above, endless belts intended to connect, with a definite fitting tension, two pulleys, the dimensions of which and the distances between the axles of which are both fixed. Such a belt can be made with an initial length such as it is to have when it is in place upon the pulleys and the desired fitting tension is obtained.

While it is preferred to use latex of rubber or other vulcanizable material for the impregnation of the fabric, it is to be understood that the term "elastic material", as used in the appended claims, is intended to embrace any elastic or plastic substance that is suitable for the described purpose.

What I claim is:

1. Process for the manufacture of endless and unjointed belts which consists in loosely weaving in the form of a tube of fabric very open linear elements composed of rovings individually supertwisted in the same direction and assembled by being twisted together in the opposite direction approximately the same number of turns as those of the individual twistings, treating the tubular fabric thus formed while not under substantial tension with a strong contracting and swelling agent, impregnating the same with a vulcanizable material, vulcanizing the same, and cutting the vulcanized tubular fabric into rings of width equal to the desired width of the belts to be obtained.

2. Process for the manufacture of an endless and unjointed belt which consists in loosely weaving in the form of a ring of fabric very open linear elements composed of rovings individually supertwisted in the same direction and assembled by being twisted together in the opposite direction approximately the same number of turns as those of the individual twistings, treating the ring of fabric thus formed while not under substantial tension with a strong contracting and swelling agent, impregnating the same with a vulcanizable material, stretching it, and vulcanizing it while in an extended condition, the ring of fabric being woven initially with such width that, after the successive treatments of contraction and swelling, of impregnation, stretching and vulcanization, the ring of fabric has the desired width of the belt to be obtained.

3. Process for the manufacture of endless and unjointed belts which consists in loosely weaving in the form of a tube of fabric very open linear elements composed of rovings individually supertwisted in the same direction and assembled by being twisted together in the opposite direction approximately the same number of turns as those of the individual twistings, treating the tubular fabric thus formed while not under substantial tension with a bath formed with a strong contracting and swelling agent and added with a wetting agent, thereafter subjecting the fabric to a boiling treatment, and then to a washing treatment, then drying the same and impregnating the fabric with a vulcanizable material, vulcanizing the same and cutting the vulcanized tubular fabric into rings of width equal to the desired width of the belts to be obtained.

4. Process for the manufacture of endless and unjoined belts which consists in loosely weaving in the form of a tube of fabric very open linear elements composed of rovings individually supertwisted in the same direction and assembled by being twisted together in the opposite direction approximately the same number of turns as those of the individual twistings, treating the tubular fabric thus formed while not under substantial tension with a bath formed with a strong contracting and swelling agent and added with a wetting agent, thereafter subjecting the fabric to a boiling treatment, and then to a washing treatment, then drying the same and impregnating the fabric with a vulcanizable material, coagulating the same and eliminating water therefrom, stretching the impregnated fabric in one direction, vulcanizing the same and cutting the vulcanized tubular fabric into rings of width equal to the desired width of the belts to be obtained.

5. Process for the manufacture of an endless and unjointed belt which consists in loosely weaving in the form of a ring of fabric very open linear elements composed of rovings individually supertwisted in the same direction and assembled by being twisted together in the opposite direction approximately the same number of turns as those of the individual twistings, treating the ring of fabric thus formed while not under substantial tension with a bath formed with a strong contracting and swelling agent and added with a wetting agent, thereafter subjecting the fabric to a boiling treatment and then to a washing treatment, then drying the same and impregnating the fabric with a vulcanizable material, coagulating the same and vulcanizing it while in an extended condition, the ring of fabric being woven initially with such width that, after the successive treatments of contraction and swelling, of impregnation, stretching and vulcanization, the ring of fabric has the desired width of the belt to be obtained.

6. Process as set forth in claim 3, further characterized in that the impregnating tubular fabric is subjected to stretching in the radial direction of the belt for so long a time that it does not shrink appreciably during the interval between its removal from the stretcher and the termination of the vulcanizing operation, and in that the fabric is then removed from the stretcher and vulcanized.

7. Process as set forth in claim 3, further characterized in that the impregnated tubular fabric is subjected to a stretching in radial direction of the belt sufficient to acquire a length superior to that finally desired, removing the tubular fabric from the stretcher and vulcanizing it when it has regained the desired length.

8. A power-transmission belt comprising an endless and unjointed fabric composed of a plurality of rovings individually supertwisted in the same direction and assembled by being twisted together in the opposite direction to form linear elements, the reverse twisting comprising approximately the same number of turns as the individual twistings so that the said linear elements are equilibrized, said fabric being embedded in a mass of elastic material which fills the interstices thereof and of said linear elements, binding their fibres together into a dense coherent mass.

9. Process for the manufacture of endless and unjointed belts which comprises weaving into a tubular loose mesh fabric linear elements composed of rovings as prepared for making thread to which has been given a supplementary torsion in one direction and which have been then assembled by being twisted in the opposite direction a number of turns such that the so formed linear element shows a high tensile resistance and elasticity and is widely open and highly permeable throughout by liquids, treating the so made tubular fabric without tension by means of a contracting and swelling agent without substantially compressing the said linear elements and their fibres and stretching longitudinally the so impregnated ring to such an extent that a part of the longitudinal elasticity of the ring has been eliminated and vulcanizing the so stretched ring.

10. An endless and unjointed transmission belt comprising a fabric ring formed of linear elements composed of rovings to which has been given individually a supplementary torsion in one direction and assembled by being twisted in the opposite direction, each of the so formed linear elements possessing a high tensile strength and elasticity and being permeated and impregnated throughout with rubber, the said linear elements being contracted and swollen and being united together by rubber impregnating.

11. A highly flexible transmission belt comprising an endless and unjointed fabric ring formed of linear elements composed of rovings to which has been given individually a supplementary torsion in one direction and assembled by being twisted together in the opposite direction, the fibers of the said fabric being contracted and swollen and being separated from each other by an elastic material adhering thereto and permeating and impregnating throughout the fabric ring, said belt so constituted possessing a higher elasticity in the longitudinal than in the transverse direction.

LÉON SYLVAIN MAX LEJEUNE.